Sept. 20, 1971     N. L. RANSOM     3,606,290

APPARATUS FOR THE PRECIPITATION OF METALS FROM SOLUTION

Original Filed Jan. 23, 1967     2 Sheets-Sheet 1

INVENTOR.
NEALAND LYNN RANSOM

BY
MALLINCKRODT & MALLINCKRODT

ATTORNEYS

United States Patent Office 3,606,290
Patented Sept. 20, 1971

3,606,290
APPARATUS FOR THE PRECIPITATION OF METALS FROM SOLUTION
Nealand Lynn Ransom, Chuquicamata, Chile, assignor to Kennecott Copper Corporation, New York, N.Y.
Original application Jan. 23, 1967, Ser. No. 610,946. Divided and this application Sept. 10, 1969, Ser. No. 870,973
Int. Cl. C22b 3/02
U.S. Cl. 266—22
7 Claims

ABSTRACT OF THE DISCLOSURE

Apparatus for precipitating metal values from solution on massed descrete pieces of solid precipitant. A precipitation vessel of inverted conical formation is charged with the precipitant, and the pregnant solution containing the metal values is injected under pressure into the mass of precipitant through a nozzle located at the downwardly-directed apex of the vessel. The nozzle is of special formation comprising an outwardly divergent channel member of conical formation inset into a discharge orifice to provide an annular nozzle opening concentrically surrounding a central nozzle opening. The force of the incoming solution creates a void in the mass of precipitant immediately above the nozzle, and, as pieces of partially consumed precipitant fall into the void above the nozzle, their surfaces are scrubbed clean of adherent precipitate which is carried upwardly by the solution to overflow through a screen that extends preferably vertically upwardly from the overflow rim of the vessel.

---

Figure 1:
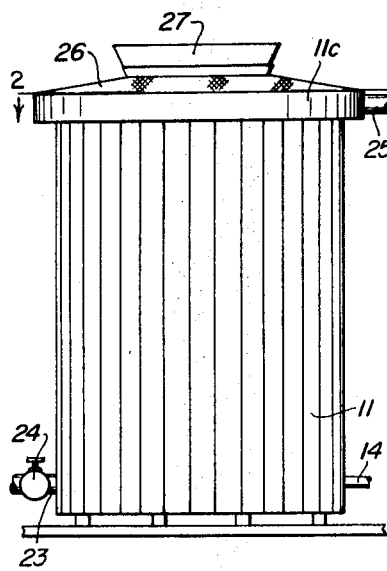

This is a division of application Ser. No. 610,946, filed Jan. 23, 1967, and now abandoned.

This invention relates to the type of apparatus disclosed in the copending application of Stuart R. Zimmerley and Emil E. Malouf, Ser. No. 319,302, filed Oct. 28, 1963, and entitled "Process and Apparatus for the Precipitation of Substances From Solution Using Solid Precipitants" and now Pat. No. 3,333,953. It is concerned with what I regard as improvements in the apparatus specifically set forth in that copending application, and with what in any event is a different way of accomplishing the results sought by the invention there disclosed.

I introduce the metal-bearing solution into the treatment vessel through a nozzle located at the downwardly-directed apex of such vessel, instead of through an open framework of solution-inflow piping that extends through much of the height of the vessel and has a multiplicity of jet discharge orifices disposed at intervals along the piping, as in the apparatus illustrated and described in the afore-referred-to copending patent application. By passing the feed solution through the nozzle at sufficiently high velocity, a void is forcibly established and maintained immediately above such nozzle in the body of solid precipitant that gradually descends toward the apex to replace what is consumed by the precipitation reaction, and, when the solution is a weak-acid leach solution pregnant with copper and the precipitant is metallic iron, the copper precipitate is heavy and granular in nature and has excellent settling and dewatering characteristics.

The void in the body of precipitant, filled with high velocity solution traveling upwardly, present an especially favorable environment for washing, from the partially consumed precipitant that falls into it, adherent precipitate that would otherwise interfere with and delay the precipitation reaction, and makes for rapid and substantially complete consumption of the precipitant.

The apparatus of this invention is especially suitable for use with light scrap iron, such as detinned crushed or shredded tin cans, as the precipitant for copper in solution.

In order to insure against hang-up of the body of precipitant in the upper part of the catch receptacle that surrounds the treatment vessel and against consequent interference with gravity feed of precipitant into the void above the nozzle, and in order further, to guard against possible blinding of the screen that divides the interior of the catch receptacle from the interior of the precipitation vessel, through which screen the copper precipitates settle as they are released from upward travel with the solution by reason of the decrease in velocity of such solution as it travels upwardly, it is advantageous to position such screen vertically, rather than on a slope. This is an advantage regardless of how the pregnant solution is introduced into the precipitation vessel, but especially so with the nozzle input here disclosed.

A form of nozzle that has been found to be particularly advantageous has provision for diverting part of the feed stream outwardly in a conical outer flow, and for diffusing the remainder of the feed stream and passing it axially of such conical outer flow.

There are shown in the accompanying drawings specific embodiments of the apparatus of the invention, representing what are presently regarded as the best mode of carrying out the invention in commercial practice. From the detailed description of these, other more specific objects and features of the invention will become apparent.

Figure 2:
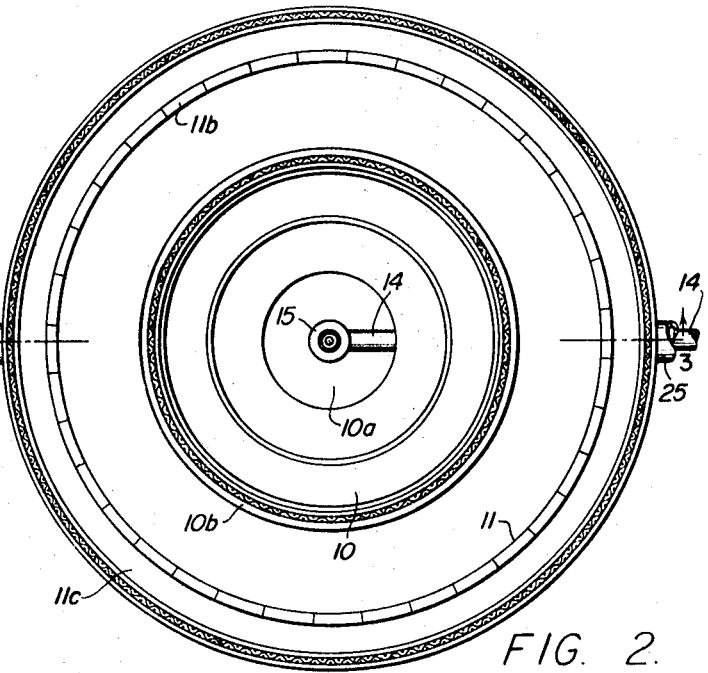
Figure 3:
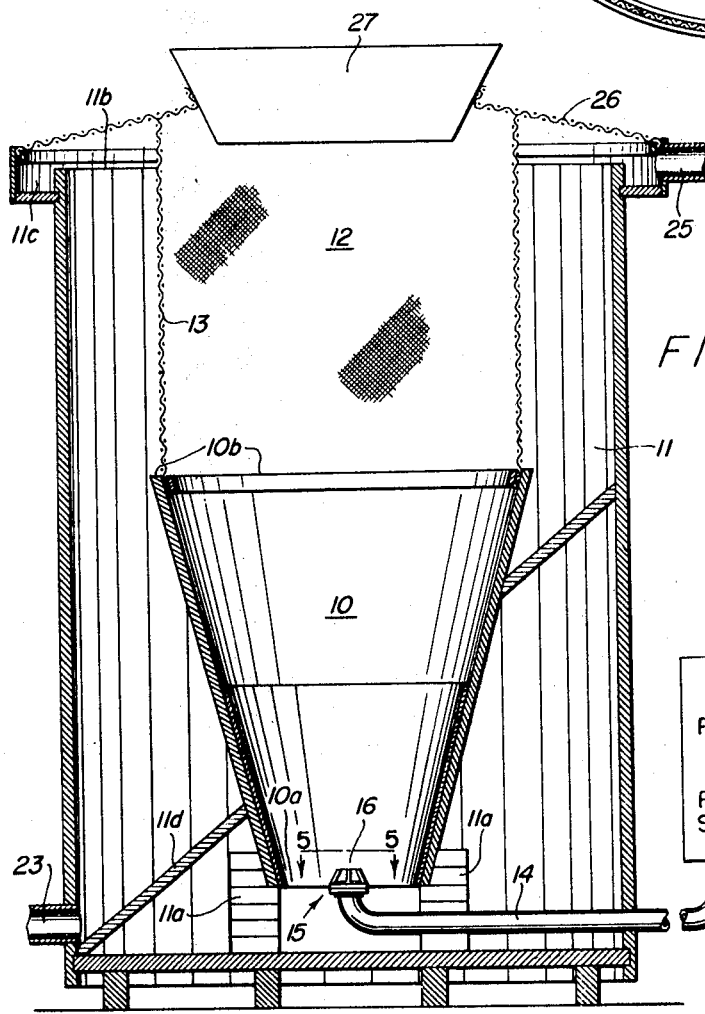
Figure 4:
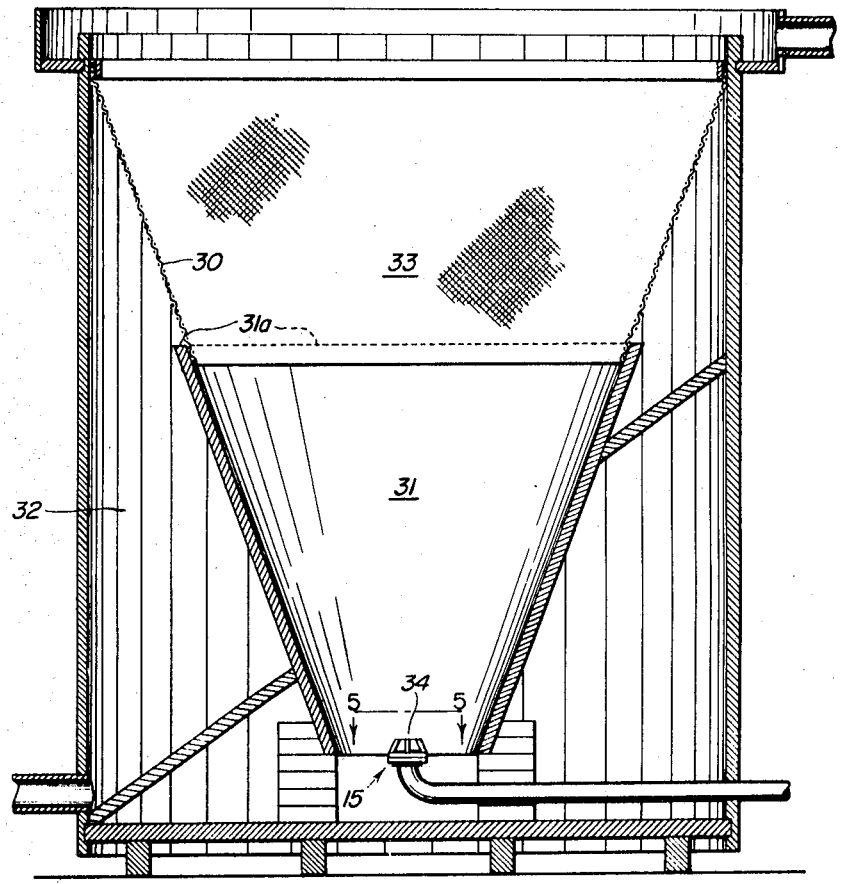
Figure 5:
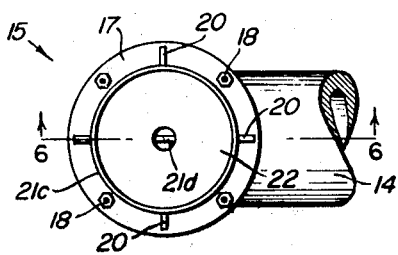

In the drawings:
FIG. 1 represents a side elevation of a preferred embodiment of the apparatus;
FIG. 2, a horizontal section taken on the line 2—2 of FIG. 1 and drawn to a considerably larger scale;
FIG. 3, a central vertical section taken on the line 3—3 of FIG. 2;
FIG. 4, a corresponding view of an embodiment following more closely the apparatus of the afore-referred-to copending application;
FIG. 5, a fragmentary top plan of the special nozzle used in both embodiments of apparatus, drawn to a scale considerably larger than that of FIGS. 3 and 4; and
FIG. 6, a central vertical section taken on the line 6—6 of FIG. 6.

Referring to the drawings:
In the embodiment of FIGS. 1-3, the apparatus comprises a generally conical precipitation vessel 10 of acid-resistant material, such as stainless steel, that has a downwardly directed apex 10a and an overflow rim 10b, and is positioned within a larger catch receptacle 11, also of acid-resistant material such as the wood staves shown. Both vessel 10 and catch receptacle 11 are open-topped for reception of a mass 12 of discrete pieces of solid precipitant, such as the tin cans previously mentioned.

The interior of vessel 10 is separated from the interior of catch receptacle 11 by means of a vertically positioned screen 13 of cylindrical formation that rises from overflow rim 10a of the vessel and confines the mass of precipitant above the vessel, so it doesn't fall into the surrounding catch receptacle.

Pregnant solution is introduced through the open apex 10a of the precipitation vessel from a high pressure source of same, usually a pump, by means of a pipe 14 and special nozzle 15. To this end, vessel 10 has its lower end or apex positioned on a circular wall 11a built up on the bottom of catch receptacle 11 from any suitable material, such as laminated wood support rings, indicated at 11a.

Nozzle 15 is constructed to eject the solution into the body of precipitant in vessel 10 at high velocity and in a pattern such that the body of precipitant immediately above the nozzle will be displaced to establish and maintain a void, for example as indicated at 16, immediately above the nozzle, into and through which will fall portions of the precipitate from such body for scrubbing treatment by the up-surging solution.

Figure 6:
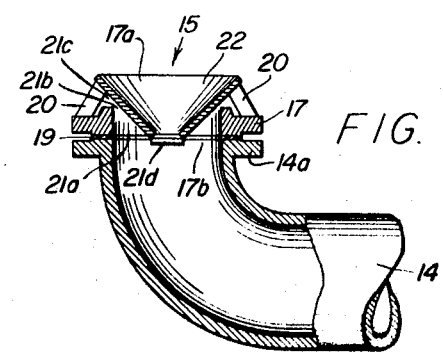

As illustrated, see particularly FIGS. 5 and 6, the nozzle 15 comprises an annular member 17 in the form of a pipe fitting adapted for rigid attachment to and over the correspondingly flanged, open, discharge end 14a of solution-supply pipe 14 by means of bolts 18, a gasket 19 being interposed therebetween.

Rigidly supported in predetermined placement at the discharge end 17a of the annular member 17, concentrically therewith, as by means of struts 20 arranged in outwardly spaced relationship circumferentially of the nozzle, is an outwardly divergent, flow channel member 21 of conical formation, having its apex open as an intake 21a for divergent flow passage 21b and its opposite, divergent end open as an outlet 21c for such divergent flow passage.

Divergent cone member 21 extends through annular member 17, in circumferentially spaced relationship therewith, with its intake apex 21a at the intake end 17b of such annular member 17, to provide an annular nozzle opening 22 between the members and intermediate the length of such divergent member 21. A bar 21d advantageously extends diametrically across intake opening 21a as a diffusing member.

As so constructed, nozzle 15 receives pregnant solution from the high pressure source that is indicated as such on the drawings and ejects it at high velocity through both the annular nozzle opening 22 and the divergent flow passage 21b. The feed stream of pregnant solution from supply pipe 14 is diverted outwardly by divergent member 21 of nozzle 15, so part of it is ejected as a conical outer flow and the remainder is passed axially of such conical outer flow as a diffused inner flow, bar 21d contributing to the diffusion of the entering stream.

It should be realized that the open apex end 21a of the divergent cone member 21 of nozzle 15 can be located substantially flush with the intake end 17b of annular member 17, as above, or can be disposed inwardly or outwardly thereof. The more outwardly, that is to say, the deeper in the open upper end of supply pipe 14 that divergent member 21 extends, the greater the dispersion of the inflowing stream of solution for any given cone slope.

The up-flowing solution in precipitation vessel 10 fills the interstices between pieces of the solid precipitant in the body 12 of same and flows over rim 10a, filling catch receptacle 11 below such rim and rising to flow over the overflow rim 11b of such catch receptacle into circumferential launder 11c, thereof, meanwhile passing through screen 13 and pervading the upper portion of the body 12 of precipitant. As in the afore-referred-to copending application Ser. No. 319,302, the iron precipitant is consumed by the reaction, and the copper precipitate is carried upwardly by the rising solution to overflow into the catch receptacle, where it settles in the relatively quiescent solution therein and collects on the sloping false bottom 11d for periodic discharge through pipe 23 under the control of valve 24. It is the stripped, i.e., spent, solution that passes over overflow rim 11b into launder 11c for disposal through discharge pipe 25.

It should be noted that the vertical position of screen 13 prevents accumulation of partially consumed precipitant thereon and consequent blinding of the screen to passage of the precipitate therethrough. This is a feature of the present invention.

Also a feature of this invention is the covering of the open top of catch receptacle 11 and of its peripheral launder 11b, usually with a screen 26 that connects with the upper end of cylindrical screen 13. A central opening is provided in screen 26 for receiving a precipitant feed chute 27.

The embodiment of apparatus shown in FIG. 4 corresponds closely with that shown in copending application Ser. No. 319,302, in that the separating screen 30 connects overflow rim 31a of conical precipitation vessel 31 with the inner walls of catch receptacle 32 and is not vertically disposed, as in the first embodiment herein. Otherwise, the same nozzle 15 for ejecting pregnant solution at high velocity into the body 33 of precipitant within vessel 31 is utilized to produce a void 34 in such body immediately above the nozzle, and operation is the same.

In either embodiment, the pregnant solution is preferably ejected from the nozzle at a velocity of about 35 feet per second or greater and at a volume of from about 3000 to 4000 gallons per minute, being supplied to the nozzle at this volume under a pressure of about 100 p.s.i. It is preferred for most purposes that the divergent cone member slope outwardly at an angle of approximately 45° to its cone axis, although considerable variation is possible.

Whereas there are here specifically set forth certain preferred procedures and apparatus that are presently regarded as the best mode of carrying out the invention, it should be understood that various changes may be made without departing from the inventive subject matter particularly pointed out and claimed herebelow.

I claim:

1. In apparatus for the precipitation of metals from solution on discrete pieces of a solid precipitant, the combination of
    a precipitation vessel having a downwardly-directed apex and an overflow rim;
    an upwardly-directed nozzle at said apex adapted for high velocity ejection of a pregnant solution in a diffuse, precipitant-displacing pattern, said nozzle comprising an annular member having intake and discharge ends, its intake end being connected to the source of pregnant solution; an outwardly divergent flow channel member of substantially conical formation, with its apex open as an intake and its opposite, divergent end open as an outlet; and means connecting said members concentrically, so the outwardly divergent member extends through the said annular member in circumferentially spaced relationship therewith, with its intake apex at the intake end of the annular member, to provide an annular nozzle opening between said annular member and said divergent member intermediate the length of the latter; and
    a high pressure source of pregnant solution adapted to supply said nozzle with said solution at a pressure sufficient to displace portions of the body of precipitant immediately above said nozzle by the velocity of solution ejected from the nozzle, to establish and maintain a void in said body immediately above said nozzle, into and through which some precipitant will fall for scrubbing treatment.

2. Apparatus according to claim 1, wherein the precipitation vessel is disposed within a larger, catch receptacle that surrounds said vessel in spaced relationship therewith and that rises thereabove; and wherein screen means rising from the overflow rim of said vessel separates the interior of the vessel from the interior of the receptacle.

3. Apparatus according to claim 2, wherein the nozzle comprises an annular member having intake and discharge ends, its intake end being connected to the source of pregnant solution; an outwardly divergent flow channel member of substantially conical formation, with its apex open as an intake and its opposite, divergent end open as an outlet; and means connecting said members concentrically, so the outwardly divergent member extends through the said annular member in circumferentially spaced relationship therewith, with its intake apex at the intake end of the annular member, to provide an annular nozzle opening between said annular member and said divergent member intermediate the length of the latter.

4. Apparatus according to claim 2, wherein the screen means is substantially vertically disposed.

5. Apparatus according to claim 4, wherein the screen means is cylindrical in formation.

6. Apparatus according to claim 5, wherein the catch receptacle is open at its top to define an overflow rim peripherally thereof; there is an overflow launder surrounding said rim; there is additional screen means covering the open top of said receptacle and said launder and connecting with the top of the vertically disposed, cylindrical screen means; and there is an opening centrally of said additional screen means leading into the space enclosed by said cylindrical screen means for charging precipitant into the precipitation vessel.

7. Apparatus for the precipitation of metals from solution on discrete pieces of a solid precipitant, including in combination
- a precipitation vessel having a downwardly-directed apex and an overflow rim;
- means for introducing pregnant solution into said vessel in intimate scrubbing association with a mass of discrete pieces of a solid precipitant therein;
- a catch receptacle larger and higher than said vessel and provided with an overflow rim, said vessel being positioned within said receptacle in spaced relationship with the walls and below the overflow rim thereof and the top of said receptacle being covered;
- a cylindrical screen extending vertically from connection with the overflow rim of said vessel to substantially the height of the overflow rim of said receptacle;
- means for introducing solid precipitant through the upper end of said screen into said vessel and said screen, said means being an opening through the covered top of said receptacle leading into the interior of the screen; and
- means for discharging settled precipitate from a low level in said receptacle.

References Cited

UNITED STATES PATENTS

| | | | |
|---|---|---|---|
| 550,583 | 12/1895 | Brinckman et al. | 23—271 |
| 787,902 | 4/1905 | Dewey | 23—271 |
| 1,163,829 | 12/1915 | Koering | 266—22 |
| 1,426,099 | 8/1922 | Prutzman | 23—271 |
| 2,371,720 | 3/1945 | Stine | 23—271 |
| 3,288,598 | 11/1966 | Hogue | 75—109 |
| 3,333,953 | 8/1967 | Zimmerley et al. | 75—109 |

FOREIGN PATENTS

| | | |
|---|---|---|
| 202,499 | 6/1906 | Germany. |

GERALD A. DOST, Primary Examiner

U.S. Cl. X.R.

23—271; 75—108, 117; 266—12